United States Patent
Park et al.

(10) Patent No.: US 11,811,060 B2
(45) Date of Patent: Nov. 7, 2023

(54) POSITIVE ELECTRODE ACTIVE MATERIAL AND LITHIUM SECONDARY BATTERY COMPRISING THE SAME

(71) Applicant: ECOPRO BM CO., LTD., Cheongju-si (KR)

(72) Inventors: Jung Bae Park, Cheongju-si (KR); Hyun Jong Yu, Cheongju-si (KR); Moon Ho Choi, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 181 days.

(21) Appl. No.: 17/380,664

(22) Filed: Jul. 20, 2021

(65) Prior Publication Data

US 2022/0115658 A1  Apr. 14, 2022

(30) Foreign Application Priority Data

Oct. 14, 2020 (KR) .................. 10-2020-0132472

(51) Int. Cl.
*H01M 4/525* (2010.01)
*H01M 4/505* (2010.01)
*H01M 10/0525* (2010.01)
*H01M 4/02* (2006.01)

(52) U.S. Cl.
CPC .......... *H01M 4/525* (2013.01); *H01M 4/505* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

2020/0083531 A1  3/2020  Choi et al.

FOREIGN PATENT DOCUMENTS

| EP | 3 647 270 A1 | 5/2020 |
| EP | 3 663 265 A2 | 6/2020 |
| KR | 10-2019-0041715 A | 4/2019 |
| WO | 2020/122497 A1 | 6/2020 |

OTHER PUBLICATIONS

Rong Li et al., "Structure and electrochemical performance modulation of a LiNi0.8Co0.1Mn0.1O2 cathode material by anion and cation co-doping for lithium ion batteries," RSC Advances, vol. 9, Nov. 12, 2019, pp. 36849-36857, doi: 10.1039/c9ra07873h.

*Primary Examiner* — Carlos Barcena
(74) *Attorney, Agent, or Firm* — Studebaker & Brackett PC

(57) ABSTRACT

The present invention relates to a positive electrode active material and a lithium secondary battery including the same, and more particularly, to a positive electrode active material which exhibits a predetermined peak intensity ratio and a predetermined voltage ratio in a graph illustrating the voltage (V) and the battery capacity (Q) at the $3^{rd}$ cycle and having an X axis indicating the voltage (V) and a Y axis indicating a value (dQ/dV) obtained by differentiating the battery capacity (Q) with respect to the voltage (V) when charging/discharging is performed under predetermined conditions, and a lithium secondary battery including the same.

14 Claims, 9 Drawing Sheets

POSITIVE ELECTRODE ACTIVE MATERIAL AND LITHIUM SECONDARY BATTERY COMPRISING THE SAME

CROSS-REFERENCE TO RELATED APPLICATION

This application claims priority to and the benefit of Korean Patent Application No. 10-2020-0132472, filed on Oct. 14, 2020, the disclosure of which is incorporated herein by reference in its entirety.

BACKGROUND

1. Field of the Invention

The present invention relates to a positive electrode active material and a lithium secondary battery including the same, and more particularly, to a positive electrode active material which exhibits a predetermined peak intensity ratio and a predetermined voltage ratio in a graph illustrating the voltage (V) and the battery capacity (Q) at the $3^{rd}$ cycle and having an X axis indicating the voltage (V) and a Y axis indicating a value (dQ/dV) obtained by differentiating the battery capacity (Q) with respect to the voltage (V) when charging/discharging is performed under predetermined conditions, and a lithium secondary battery including the same.

2. Discussion of Related Art

Batteries store electrical power by using materials facilitating an electrochemical reaction at a positive electrode and a negative electrode. As a representative example of such batteries, there is a lithium secondary battery storing electrical energy due to a difference in chemical potential when lithium ions are intercalated/deintercalated into/from a positive electrode and a negative electrode.

The lithium secondary battery uses materials enabling reversible intercalation/deintercalation of lithium ions as positive electrode and negative electrode active materials, and is produced by charging an organic electrolyte solution or a polymer electrolyte solution between the positive electrode and the negative electrode.

A lithium composite oxide is used as a positive electrode active material of the lithium secondary battery, and composite oxides such as $LiCoO_2$, $LiMn_2O_4$, $LiNiO_2$, $LiMnO_2$, etc. are being studied.

Among the positive electrode active materials, $LiCoO_2$ is most widely used due to excellent lifetime characteristics and charge/discharge efficiency, but it is expensive because of the limited resource of cobalt, which is used as a raw material, and thus has a disadvantage of limited price competitiveness.

Lithium manganese oxides such as $LiMnO_2$ and $LiMn_2O_4$ have advantages of excellent thermal safety and low costs, but also have problems of small capacity and poor high-temperature characteristics. In addition, while a $LiNiO_2$-based positive electrode active material exhibits a battery characteristic such as a high discharge capacity, due to cation mixing between Li and a transition metal, it is difficult to synthesize the $LiNiO_2$-based positive electrode active material, thereby causing a big problem in rate characteristics.

In addition, depending on the intensification of such cation mixing, a large amount of Li by-products is generated, and since most of the Li by-products consist of compounds of LiOH and $Li_2CO_3$, they become a cause of gelation in preparation of a positive electrode paste and gas generation according to charge/discharge progression after the preparation of an electrode. Residual $Li_2CO_3$ increases the swelling phenomenon of a cell and thus reduces cycles and also leads to the swelling of a battery.

To compensate for these shortcomings, the demand for a high-Ni positive electrode active material containing 50% or more of a nickel (Ni) content as a positive electrode active material for a secondary battery has begun to increase. While such a high-Ni positive electrode active material has high capacity, due to the increased nickel content in the positive electrode active material, structural instability caused by Li/Ni cation mixing occurs. Because of the structural instability of a positive electrode active material, a lithium secondary battery may dramatically deteriorate not only at high temperature but also at room temperature.

Therefore, to compensate for the problems of such a high-Ni positive electrode active material, the development of a positive electrode active material is needed.

SUMMARY OF THE INVENTION

In the lithium secondary battery market, the growth of lithium secondary batteries for electric vehicles plays a leading role, and the demand for positive electrode materials used in lithium secondary batteries is also constantly changing.

For example, conventionally, in terms of securing safety, lithium secondary batteries using LFP have been mainly used. However, recently, the use of a nickel-based lithium composite oxide, which has a larger energy capacity per weight than LFP, is expanding.

In line with the above trend of the positive electrode materials, the present invention is directed to providing a positive electrode active material which has improved electrochemical properties and stability by reducing the structural instability of a high-Ni positive electrode active material.

Particularly, the inventors used a high-Ni positive electrode active material containing an Ni content of 50% or more, and preferably, 80% or more among positive electrode active materials, and found that, when charging/discharging was performed under predetermined conditions, the electrochemical properties and stability of the positive electrode active material may be more improved when the positive electrode active material satisfied a predetermined peak intensity ratio and a predetermined voltage ratio in a graph illustrating the voltage (V) and the battery capacity (Q) at the $3^{rd}$ cycle and having an X axis indicating the voltage (V) and a Y axis indicating a value (dQ/dV) obtained by differentiating the battery capacity (Q) with respect to the voltage (V).

Accordingly, the present invention is directed to providing a positive electrode active material which exhibits a predetermined peak intensity ratio and a predetermined voltage ratio, which will be described below, in a graph illustrating the voltage (V) and the battery capacity (Q) at the $3^{rd}$ cycle and having an X axis indicating the voltage (V) and a Y axis indicating a value (dQ/dV) obtained by differentiating the battery capacity (Q) with respect to the voltage (V) when charging/discharging is performed under predetermined conditions.

In addition, the present invention is also directed to providing a positive electrode including the positive electrode active material defined herein.

Moreover, the present invention is also directed to providing a lithium secondary battery using a positive electrode defined herein.

One aspect of the present invention provides a positive electrode active material, which includes a lithium composite oxide enabling lithium intercalation/deintercalation.

The lithium composite oxide included in the positive electrode active material may include at least Ni and Co. In addition, the lithium composite oxide may further include Mn and/or Al in addition to Ni and Co.

In one embodiment, when charging/discharging was performed under the following conditions in a lithium secondary battery using the positive electrode active material as a positive electrode and a lithium foil as a negative electrode, the positive electrode active material may satisfy a peak intensity ratio (A) defined by Equation 1 below, in a graph illustrating the voltage (V) and the battery capacity (Q) at the $3^{rd}$ cycle and having an X axis indicating the voltage (V) and a Y axis indicating a value (dQ/dV) obtained by differentiating the battery capacity (Q) with respect to the voltage (V).

[Charging/Discharging Conditions]

$1^{st}$ cycle:
  Cut off voltage: 3.0V~4.3V
  charging: 0.1 C (CCCV)/discharging: 0.1 C (CC)
$2^{nd}$ cycle:
  Cut off voltage: 3.0V~4.3V
  charging: 0.1 C (CCCV)/discharging: 0.1 C (CC)
$3^{rd}$ cycle:
  Cut off voltage: 3.0V~4.4V
  charging: 1 C (CCCV)/discharging: 1 C (CC)

$$I1/I2 \geq 1.4 \qquad \text{[Equation 1]}$$

(In Equation 1, I1 is a y axis value (dQ/dV) for a peak shown between 3.0V and 3.8V in a charging region, and I2 is a y axis value (dQ/dV) for a peak shown between 3.8V and 4.1V in a charging region)

In addition, the positive electrode active material may include a lithium composite oxide represented by Formula 1 below.

[Formula 1]

(Here,
M1 is at least one selected from Mn and Al,
M2 and M3 are each independently selected from Al, Ba, B, Ce, Cr, Mg, Mn, Mo, Na, K, P, Sr, Ti, W, Nb and Zr,
M1 to M3 are different,
($0.90 \leq a \leq 1.05$, $0 \leq b \leq 0.10$, $0 \leq c \leq 0.10$, $0 \leq d \leq 0.025$, $0 \leq e \leq 0.025$, and $1.0 \leq f \leq 2.0$)

In addition, another aspect of the present invention provides a positive electrode including the positive electrode active material defined herein.

Moreover, still another aspect of the present invention provides a lithium secondary battery using the positive electrode defined herein.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
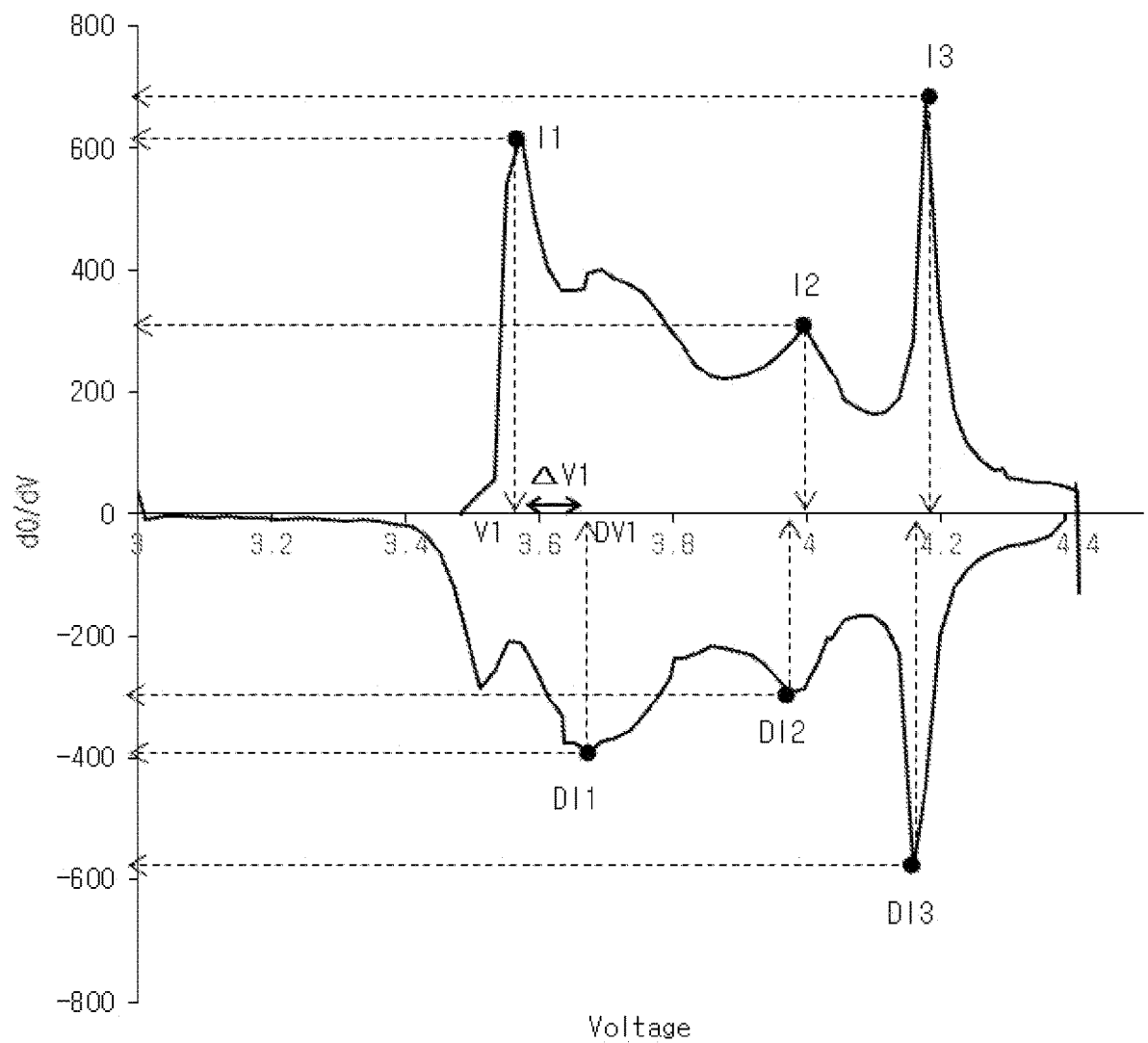
FIG. 1 is a graph illustrating the voltage (V) and the battery capacity (Q) at the $3^{rd}$ cycle and having an X axis indicating the voltage (V) and a Y axis indicating a value (dQ/dV) obtained by differentiating the battery capacity (Q) with respect to the voltage (V) when charging/discharging is performed under predetermined conditions in a lithium secondary battery using a positive electrode active material as a positive electrode and a lithium foil as a negative electrode.

In order to better understand the present invention, certain terms are defined herein for convenience. Unless defined otherwise herein, scientific and technical terms used herein will have meanings commonly understood by those of ordinary skill in the art. In addition, unless specifically indicated otherwise, terms in a singular form also include plural forms, and terms in a plural form should be understood to include singular forms as well.

Hereinafter, a positive electrode active material according to the present invention and a lithium secondary battery including the positive electrode active material will be described in further detail.

Positive Electrode Active Material

According to one aspect of the present invention, a positive electrode active material including a lithium composite oxide enabling lithium intercalation/deintercalation is provided.

The lithium composite oxide included in the positive electrode active material may include at least Ni and Co. In addition, the lithium composite oxide may further include Mn and/or Al in addition to Ni and Co.

In one embodiment, the positive electrode active material may be a bimodal-type positive electrode active material including a first lithium composite oxide, which is a small particle, and a second lithium composite oxide, which is a large particle.

In this case, as a void between large particles are filled with small particles with relatively smaller average particle diameters, the integration density of the lithium composite oxide in unit volume may be improved, thereby increasing an energy density per unit volume.

In the present invention, the range of the average particle diameters (D50) of the small particle and the large particle is not particularly limited, but to identify a lithium composite oxide as being a small particle or a large particle, the standard range of the average particle diameters (D50) of a small particle and a large particle may be determined.

A small particle refers to a lithium composite oxide having an average particle diameter (D50) of 8 μm or less, and a large particle refers to a lithium composite oxide having an average particle diameter (D50) of 8.5 μm or more. The upper limit of the average particle diameter (D50) of the large particle is not limited, but for example, the large particle may have an average particle diameter of 8.5 to 23.0 μm.

The bimodal-type positive electrode active materials according to various embodiments of the present invention may be present in a state in which the first lithium composite oxide and the second lithium composite oxide, which have the average particle diameters (D50) defined herein, are mixed in a weight ratio of 5:95 to 50:50.

Here, the first lithium composite oxide may be present in a void between the second lithium composite oxides, attached to the surface of the second lithium composite oxide, or agglomerated with each other.

Meanwhile, the first lithium composite oxide and the second lithium composite oxide of the positive electrode active material is preferably present in a weight ratio of 5:95 to 50:50.

When a proportion of the first lithium composite oxide with respect to the second lithium composite oxide in the positive electrode active material is excessively high or low, as the press density of the positive electrode active material decreases, the effect of improving the energy density per unit volume of the positive electrode active material may be insignificant.

Meanwhile, the lithium composite oxide included in the positive electrode active material may be represented by Formula 1 below. When the positive electrode active material includes a first lithium composite oxide as a small particle and a second lithium composite oxide as a large particle, the first lithium composite oxide and the second lithium composite oxide may also be represented by Formula 1 below.

$$Li_aNi_{1-(b+c+d+e)}Co_bM1_cM2_dM3_eO_f$$ [Formula 1]

(Here,
M1 is at least one selected from Mn and Al,
M2 and M3 are each independently selected from Al, Ba, B, Ce, Cr, Mg, Mn, Mo, Na, K, P, Sr, Ti, W, Nb and Zr,
M1 to M3 are different,
(0.90≤a≤1.05, 0≤b≤0.10, 0≤c≤0.10, 0≤d≤0.025, 0≤e≤0.025, and 1.0≤f≤2.0)

In addition, the first lithium composite oxide and the second lithium composite oxide are lithium composite oxides which are represented by Formula 1 and have the same composition, but the present invention is not necessarily limited thereto. For example, the first lithium composite oxide and the second lithium composite oxide have the same composition, but may be synthesized by calcination of precursors with different average particle diameters, the first lithium composite oxide and the second lithium composite oxide may have different compositions, and may be synthesized by the calcination of precursors with different average particle diameters.

Meanwhile, the lithium composite oxide represented by Formula 1 may be a high-Ni-type lithium composite oxide having an Ni content (molar ratio) of 80% or more. Here, the Ni content in the lithium composite oxide may be determined by a value of b+c+d+e in Formula 1 below.

$$Ni\ (mol\ \%)/(Ni+Co+M1+M2+M3)\ (mol\ \%)≥80$$

The positive electrode active material according to the present invention may exhibit a predetermined peak intensity ratio and a predetermined voltage ratio in a graph illustrating the voltage (V) and the battery capacity (Q) at the $3^{rd}$ cycle and having an X axis indicating the voltage (V) and a Y axis indicating a value (dQ/dV) obtained by differentiating the battery capacity (Q) with respect to the voltage (V) when charging/discharging is performed under predetermined conditions, and in this case, the high capacity characteristics of a high-Ni positive electrode active material having an Ni content of 50% or more, and preferably, 80% or more, may be maintained, and the structural instability, pointed out as a disadvantage of the high-Ni positive electrode active material, may be improved.

Specifically, when charging/discharging was performed under the following charging/discharging conditions in a lithium secondary battery using the positive electrode active material as a positive electrode and a lithium foil as a negative electrode, the positive electrode active material may satisfy a peak intensity ratio (A) defined by Equation 1 below, in a graph illustrating the voltage (V) and the battery capacity (Q) at the $3^{rd}$ cycle and having an X axis indicating the voltage (V) and a Y axis indicating a value (dQ/dV) obtained by differentiating the battery capacity (Q) with respect to the voltage (V).

[Charging/Discharging Conditions]
$1^{st}$ cycle:
  Cut off voltage 3.0V~4.3V
  charging: 0.1 C (CCCV)/discharging: 0.1 C (CC)
2nd cycle:
  Cut off voltage 3.0V~4.3V
  charging: 0.1 C (CCCV)/discharging: 0.1 C (CC)
$3^{rd}$ cycle:
  Cut off voltage 3.0V~4.4V
  charging: 1 C (CCCV)/discharging: 1 C (CC)

$$I1/I2≥1.4$$ [Equation 1]

(In Equation 1, I1 is a y axis value (dQ/dV) for a peak shown between 3.0V and 3.8V in a charging region, and I2 is a y axis value (dQ/dV) for a peak shown between 3.8V and 4.1V in a charging region)

In the positive electrode active material, a change in crystal structure (phase transformation) may occur in charging/discharging, I1 is the y axis value (dQ/dV) of a peak shown in a H1 (hexagonal1)-to-monoclinic (M) phase transformation region (H1→M), and I2 is they axis value (dQ/dV) of a peak shown in a monoclinic (M)-to-hexagonal2 (H2) phase transformation region (M→H2).

Here, in the M→H2 phase transformation region compared to the H1→M phase transformation region, the damage applied to the positive electrode active material according to the change in crystal structure may be relatively larger, resulting in the destruction of the crystal structure of the positive electrode active material. Accordingly, since the I12 is relatively smaller than the I1, an I1/I2 of 1.4 or more is preferable in terms of the stability of the positive electrode active material.

In addition, the positive electrode active material may satisfy a peak intensity ratio (B) defined by Equation 2 below.

$$I1/I3 \geq 0.7 \qquad \text{[Equation 2]}$$

(In Equation 2, I1 is a y axis value (dQ/dV) for a peak shown between 3.0V and 3.8V in a charging region, and I3 is a y axis value (dQ/dV) for a peak shown between 4.1V and 4.4V in a charging region)

Likewise, I3 is a y axis value (dQ/dV) of a peak shown in a hexagonal2 (H2)-to-hexagonal3 (H3) phase transformation region (H2→H3). Like Equation 1, in the H2→H3 phase transformation region compared to the H1→M phase transformation region, the damage applied to the positive electrode active material according to the change in crystal structure may be relatively larger. Accordingly, since the peak intensity of I3 has a smaller value than that of I1, when I1/I3 is 0.7 or more, it is preferable in terms of the stability of the positive electrode active material.

In addition, the positive electrode active material may satisfy a peak intensity ratio (C) defined by Equation 3 below.

$$I2/I3 \geq 0.5 \qquad \text{[Equation 3]}$$

(In Equation 3, I2 is a y axis value (dQ/dV) for a peak shown between 3.8V and 4.1V in a charging region, and I3 is a y axis value (dQ/dV) for a peak shown between 4.1V and 4.4V in a charging region)

Here, in the H2→H3 phase transformation region compared to the M→H2 phase transformation region, the damage applied to the positive electrode active material according to the change in crystal structure may be relatively larger. Accordingly, since the I3 is relatively smaller than the I2, when I2/I3 is 0.5 or more, it may contribute to an improvement in stability of the positive electrode active material.

In addition, the positive electrode active material may satisfy a peak intensity ratio (D) defined by Equation 4.

$$DI1/DI2 \geq 1.25 \qquad \text{[Equation 4]}$$

(In Equation 4, DI1 is a y axis value (dQ/dV) for a peak shown between 3.0V and 3.8V in a discharging region, and DI2 is a y axis value (dQ/dV) for a peak shown between 3.8V and 4.1V in a discharging region)

In the positive electrode active material, during discharging, like charging, the change in crystal structure may occur in the reverse order of the charging.

Specifically, DI1 is they axis value (dQ/dV) of a peak shown in a monoclinic (M)-to-H1 (hexagonal1) phase transformation region (M→H1) and DI2 is the y axis value (dQ/dV) in a hexagonal2 (H2)-to-monoclinic (M) phase transformation region (H2→M).

Here, in the H2→M phase transformation region compared to the M→H1 phase transformation region, the damage applied to the positive electrode active material according to the change in crystal structure may be relatively larger, resulting in the destruction of the crystal structure of the positive electrode active material. Accordingly, since the DI2 is relatively smaller than the DI1, a DI1/DI2 of 1.25 or more is preferable in terms of the stability of the positive electrode active material.

In addition, the positive electrode active material may satisfy a peak intensity ratio (E) defined by Equation 5 below.

$$DI1/DI3 \geq 0.41 \qquad \text{[Equation 5]}$$

(In Equation 5, DI1 is a y axis value (dQ/dV) for a peak shown between 3.0V and 3.8V in a discharging region, and DI3 is a y axis value (dQ/dV) for a peak shown between 4.1V and 4.4V in a discharging region)

Likewise, DI3 is a y axis value (dQ/dV) of a peak shown in a hexagonal3 (H3)-to-hexagonal2 (H2) phase transformation region (H3→H2), and like Equation 4, in the H3→H2 phase transformation region compared to the H2→M phase transformation region, the damage applied to the positive electrode active material according to the change in crystal structure may be relatively larger. Accordingly, since the peak intensity of DI3 is smaller than that of DI1, when DI1/DI3 is 0.41 or more, it is preferable in terms of the stability of the positive electrode active material.

In addition, the positive electrode active material may satisfy a peak intensity ratio (F) defined by Equation 6 below.

$$DI2/DI3 \geq 0.34 \qquad \text{[Equation 6]}$$

(In Equation 6, DI2 is a y axis value (dQ/dV) for a peak shown between 3.8V and 4.1V in a discharging region, and DI3 is a y axis value (dQ/dV) for a peak shown between 4.1V and 4.4V in a discharging region)

Here, in the H3→H2 phase transformation region compared to the H2→M phase transformation region, the damage applied to the positive electrode active material according to the change in crystal structure may be relatively larger. Accordingly, since the DI3 is relatively smaller than the DI2, when DI2/DI3 is 0.34 or more, it may contribute to the improvement in stability of the positive electrode active material.

In addition, the positive electrode active material may satisfy a voltage ratio (G) defined by Equation 7 below.

$$|\Delta V1 = (V1 - DV1)| \leq 0.05 \qquad \text{[Equation 7]}$$

(In Equation 7, V1 is an X-axis value (V) for a peak shown between 3.0V and 3.8V in a charging region, and DV1 is an X-axis value (V) for a peak shown between 3.0V and 3.8V in a discharging region)

V1 is a voltage value of the I1 peak during charging, DV1 is a voltage value corresponding to the DI1 peak during discharging, and ideally, the voltage value of the I1 peak should be the same as that of the DI1 peak, but there may be a difference between the voltage value of the I1 peak and the voltage value of the DI1 peak due to a resistance or kinetic problem. However, as the positive electrode active materials at least satisfying Equations 1 to 6 exhibit excellent resistance characteristics, it is possible for ΔV1 shown by Equation 7 to have a value of 0.05 or less.

In the lithium composite oxide containing Ni, Li impurities such as residual lithium, that is, LiOH and $Li_2CO_3$, may be formed on the surface of the lithium composite oxide by cationic mixing of Li and Ni. These Li impurities may be gelated in the preparation of a paste for forming a positive electrode, or act as a cause of a cell swelling phenomenon.

The Li impurities may be formed in a larger amount in a high-Ni-type positive electrode active material, and as to be described later, the positive electrode active material according to the present invention may cover at least a part of the surface of the lithium composite, and has an advantage that Li impurities present on the surface of the lithium composite oxide may be removed in the process of forming a coating layer containing a metal oxide.

More specifically, the positive electrode active material may cover at least a part of the surface of the lithium composite oxide, and include a coating layer containing a metal oxide.

In addition, the metal oxide contained in the coating layer may be represented by Formula 2 below. Here, the coating layer may be defined as a region in which the metal oxide represented by Formula 2 below is present on the surface of the lithium composite oxide.

$$Li_xM4_yO_z \quad \text{[Formula 2]}$$

(Here, M4 is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd, $0 \leq x \leq 10$, $0 \leq y \leq 8$, and $2 \leq z \leq 13$)

In addition, the coating layer may contain different types of metal oxides in one layer, or different types of metal oxides represented by Formula 2 in separate layers.

The metal oxide represented by Formula 2 may be physically and/or chemically bonded with a primary particle represented by Formula 1. In addition, the metal oxide may form a solid solution with the primary particle represented by Formula 1.

The positive electrode active material according to one embodiment may include a coating layer covering at least a part of the surface of the first lithium composite oxide and the second lithium composite oxide, thereby increasing structural stability. In addition, when the positive electrode active material is used in a lithium secondary battery, the high temperature storage stability and lifetime characteristics of the positive electrode active material may be improved. In addition, the metal oxide may reduce residual lithium on the surfaces of the first lithium composite oxide and the second lithium composite oxide and serve as a migration pathway of lithium ions, and thus may affect an improvement in efficiency characteristics of a lithium secondary battery.

In addition, the metal oxide may be an oxide in which lithium and an element represented by A are combined, or an oxide of A, and may be, for example, $Li_aW_bO_c$, $Li_aZr_bO_c$, $Li_aTi_bO_c$, $Li_aNi_bO_c$, $Li_aB_bO_c$, $Li_a Co_bO_c$, $Li_aAl_bO_c$, $Co_bO_c$, $Al_bO_c$, $W_bO_c$, $Zr_bO_c$, $Ti_bO_c$ or $B_bO_c$, but the above examples are merely described for convenience of understanding, and the oxide defined in the present invention is not limited to the above-described examples.

In another embodiment, the metal oxide may be an oxide in which lithium and at least two types of elements represented by A are combined, and further include a metal oxide in which lithium and at least two types of elements represented by A are combined. The metal oxide in which lithium and at least two types of elements represented by A are combined may be, for example, $Li_a(W/Ti)_bO_c$, $Li_a(W/Zr)_bO_c$, $Li_a(W/Ti/Zr)_bO_c$, or $Li_a(W/Ti/B)_bO_c$, but the present invention is not necessarily limited thereto.

Here, the metal oxide may a concentration gradient decreasing from the surface toward the center of the secondary particle. Accordingly, the concentration of the metal oxide may be reduced from the outermost surface of the secondary particle toward the center thereof.

As described above, as the metal oxide has a concentration gradient decreasing from the surface toward the center of the secondary particle, residual lithium present on the surface of the positive electrode active material may be effectively reduced, thereby preventing side effects caused by unreacted residual lithium in advance. In addition, a decrease in crystallinity inside the surface of the positive electrode active material by the metal oxide may be prevented. In addition, the destruction of the entire structure of the positive electrode active material by the metal oxide in an electrochemical reaction may be prevented.

In addition, the coating layer may include a first oxide layer containing at least one metal oxide represented by Formula 2, and a second oxide layer including at least one metal oxide represented by Formula 2, which is different from the metal oxide included in the first oxide layer.

For example, the first oxide layer may be present to cover at least a part of an exposed surface of the primary particle which is present on the outermost surface of the secondary particle, and the second oxide layer may be present to cover at least a part of the exposed surface of the primary particle which is not covered by the first oxide layer and the surface of the first oxide layer.

Meanwhile, when the first lithium composite oxide and the second lithium composite oxide are defined as composite particles including at least one primary particle, the coating layer may not only cover at least a part of the composite particle (e.g., a secondary particle), but may also be present at the interface between a plurality of primary particles constituting the composite particle.

In addition, the coating layer may be present as layer that continuously or discontinuously coats the surface(s) of the primary particle and/or the secondary particle. When the coating layer is discontinuously present, the coating layer may be present in the form of an island. In another case, the coating layer may be present in the form of a solid solution in which there is no interface between the primary particle and/or the secondary particle formed by aggregating the primary particles.

Meanwhile, the coating layer may be obtained by first calcination after a precursor of the lithium composite oxide is mixed with a raw material of the metal oxide represented by Formula 2, or first calcination of a precursor of the lithium composite oxide and then second calcination after being mixed with a raw material of the metal oxide represented by Formula 2.

In addition, the lithium composite oxide enabling lithium intercalation/deintercalation may be a composite particle including at least one primary particle. When the lithium composite oxide includes a plurality of primary particles, it may be present as a secondary particle that is an aggregate in which the plurality of primary particles are aggregated.

The primary particle refers to one grain or crystallite, and the secondary particle refers to an aggregate formed by aggregating a plurality of primary particles. There may be voids and/or a grain boundary between the primary particles constituting the secondary particle.

Particularly, according to the present invention, the surface area and boundary surface of the lithium composite oxide may be reduced by lowering a grain boundary density of the lithium composite oxide, and thus side reactions between the positive electrode active material and an electrolyte solution may be reduced to improve high temperature stability as well as storage stability of the positive electrode active material.

Specifically, the lithium composite oxide may have a grain boundary density of 0.90 or less, as calculated by Equation 8 below, for primary particles (P) lying on a virtual straight line (L) crossing the center of the lithium composite oxide in a cross-sectional SEM image.

Grain boundary density=(the number of boundary surfaces (B) between primary particles lying on the virtual straight line (L)/the number of primary particles (P) lying on the virtual straight line) [Equation 8]

Figure 2:
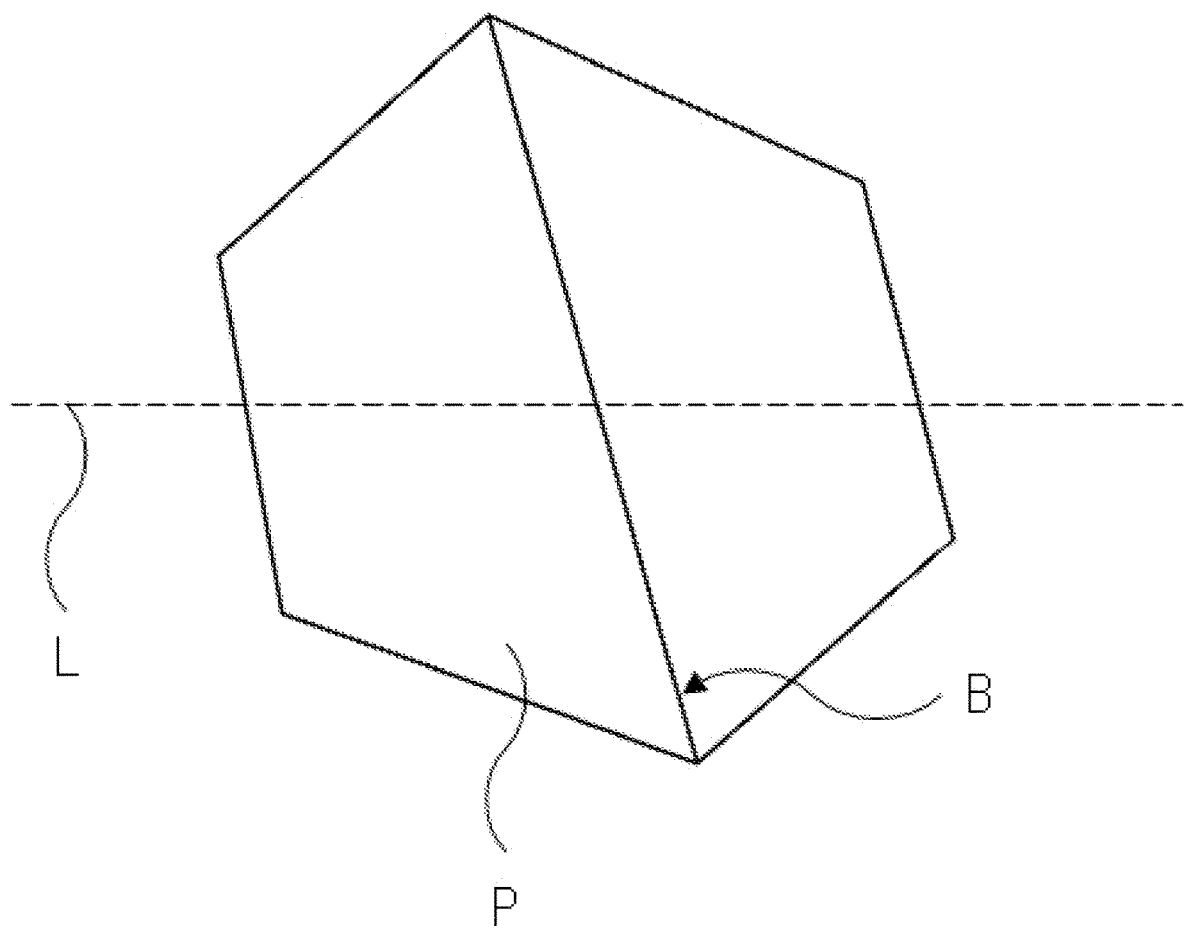
FIGS. 2 and 3 schematically show the cross-section of a lithium composite oxide from which a grain boundary density defined herein is calculated.
Figure 3:
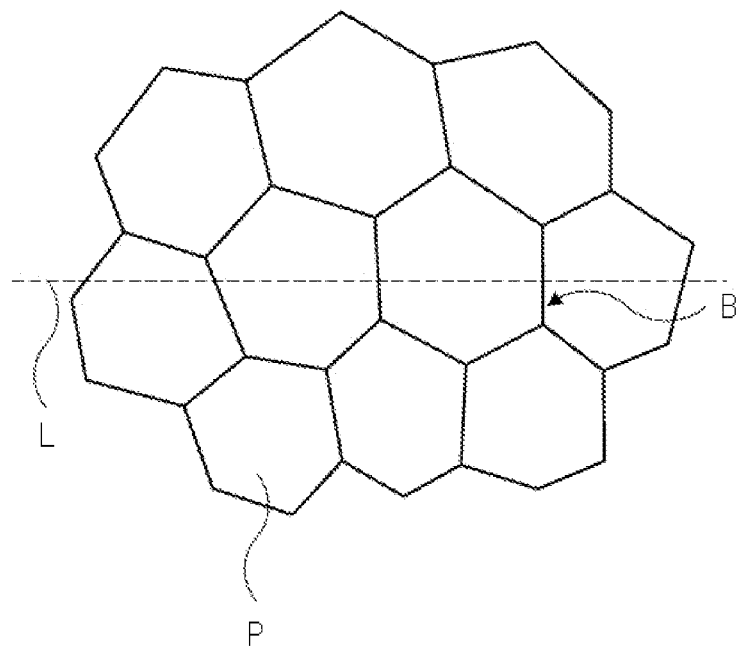
Figure 4:
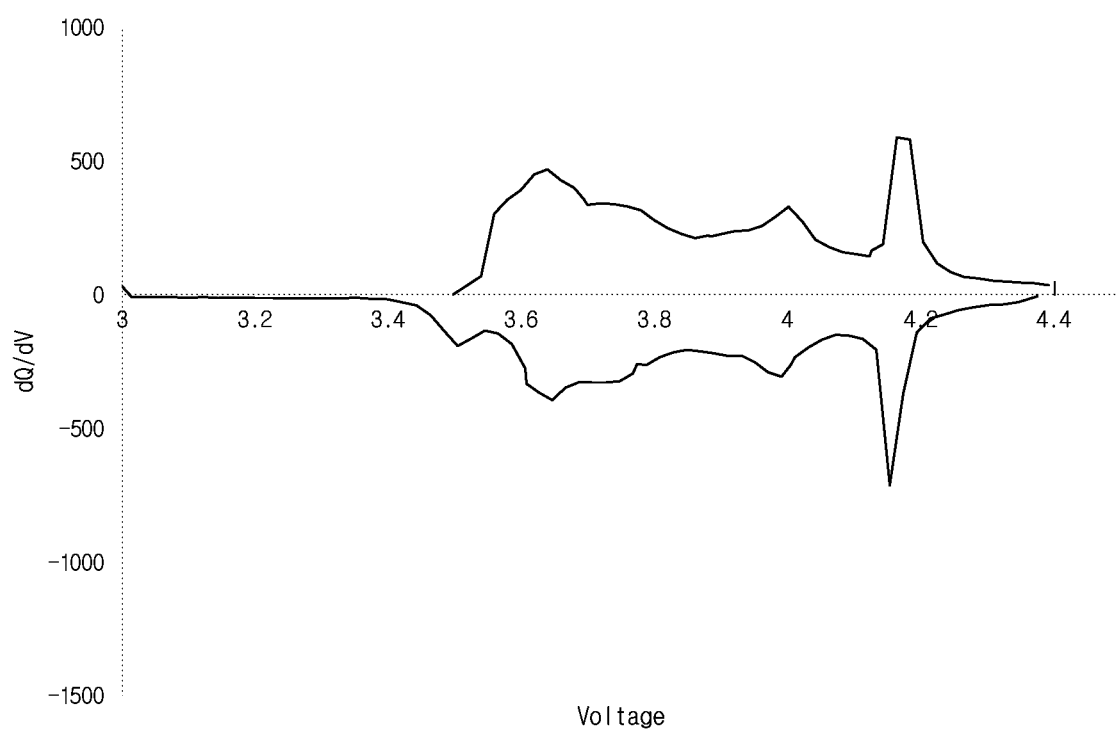
FIG. 4 is a graph illustrating the voltage (V) and the battery capacity (Q) at the $3^{rd}$ cycle and having an X axis indicating the voltage (V) and a Y axis indicating a value (dQ/dV) obtained by differentiating the battery capacity (Q) with respect to the voltage (V) when charging/discharging is performed under predetermined conditions in a lithium secondary battery using a positive electrode active material according to Example 1 as a positive electrode and a lithium foil as a negative electrode.
Figure 5:
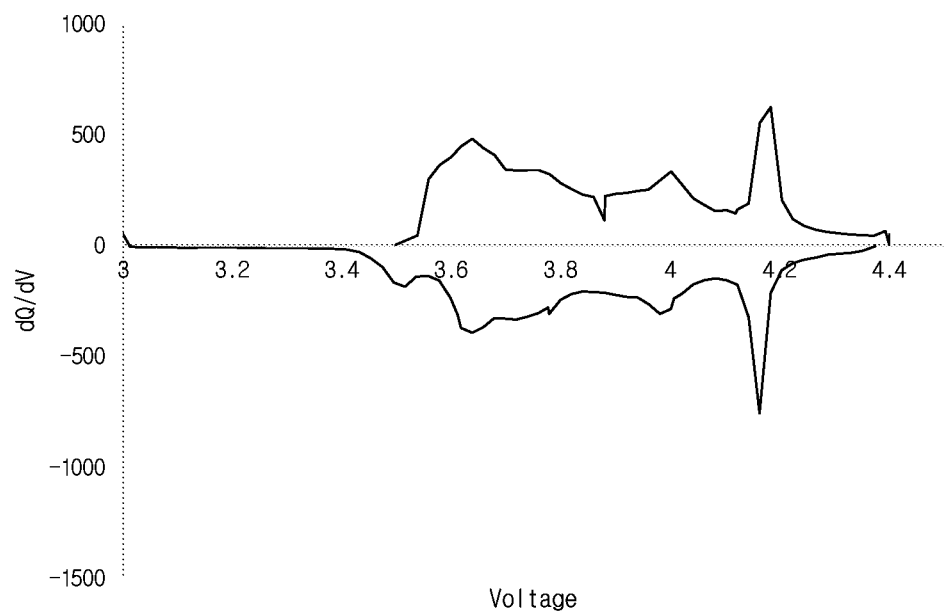
FIG. 5 is a graph in which the X axis indicates a voltage (V) and the Y axis indicates dQ/dV for a positive electrode active material according to Example 2.
Figure 6:
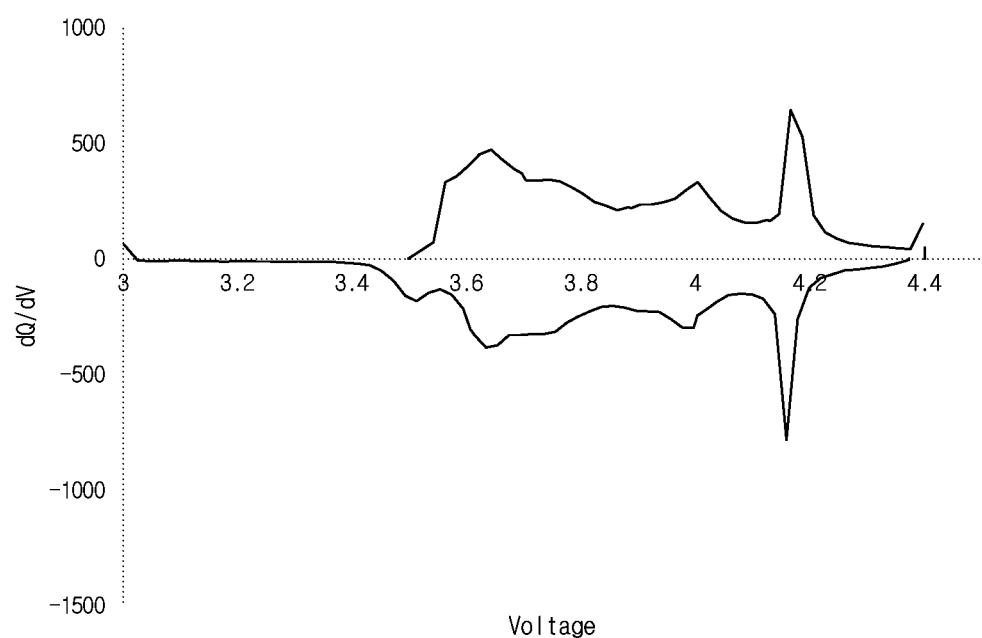
FIG. 6 is a graph in which the X axis indicates a voltage (V) and the Y axis indicates dQ/dV for a positive electrode active material according to Example 3.
Figure 7:
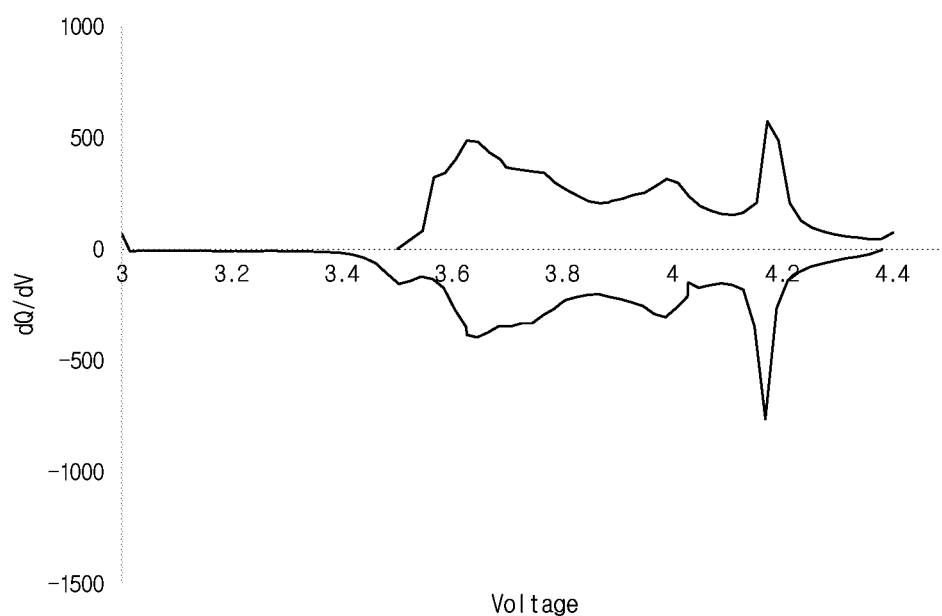
FIG. 7 is a graph in which the X axis indicates a voltage (V) and the Y axis indicates dQ/dV for a positive electrode active material according to Example 4.
Figure 8:
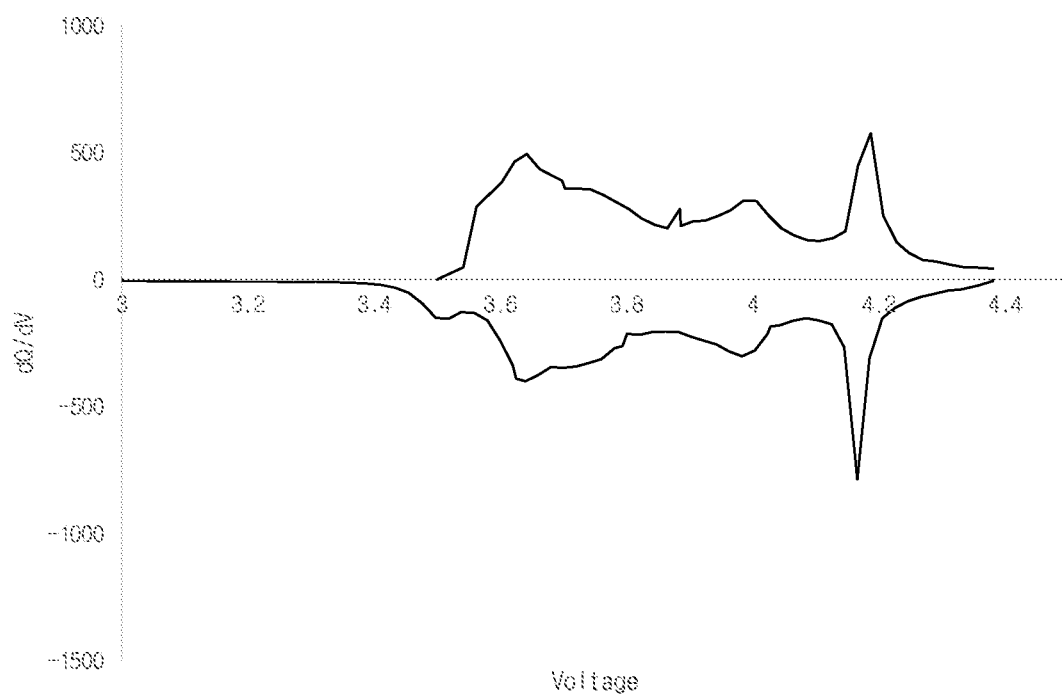
FIG. 8 is a graph in which the X axis indicates a voltage (V) and the Y axis indicates dQ/dV for a positive electrode active material according to Example 5.
Figure 9:
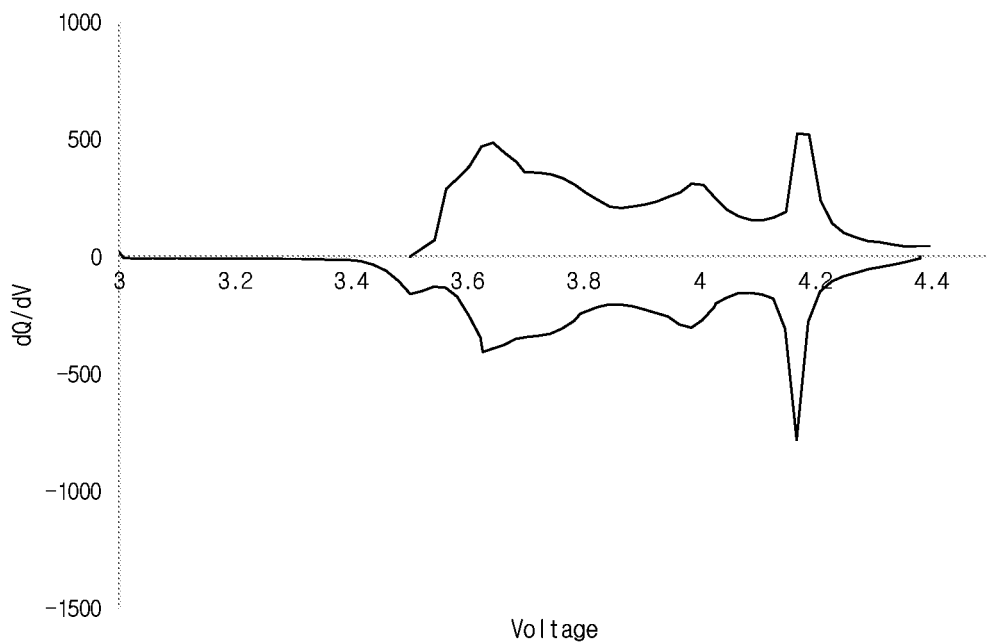
FIG. 9 is a graph in which the X axis indicates a voltage (V) and the Y axis indicates dQ/dV for a positive electrode active material according to Example 6.
Figure 10:
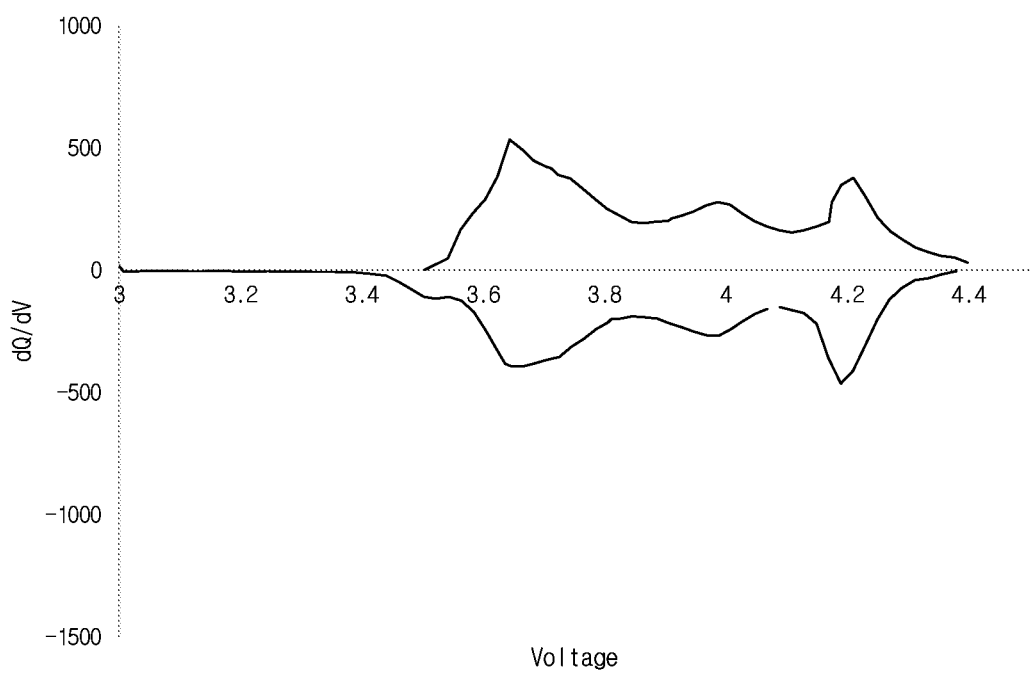
FIG. 10 is a graph in which the X axis indicates a voltage (V) and the Y axis indicates dQ/dV for a positive electrode active material according to Example 7.
Figure 11:
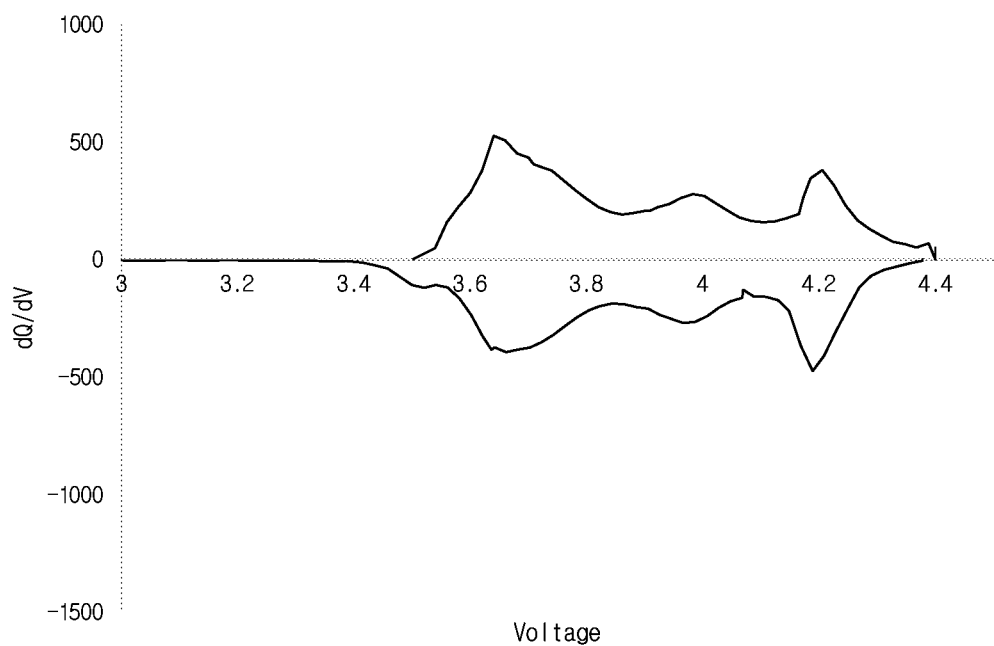
FIG. 11 is a graph in which the X axis indicates a voltage (V) and the Y axis indicates dQ/dV for a positive electrode active material according to Example 8.
Figure 12:
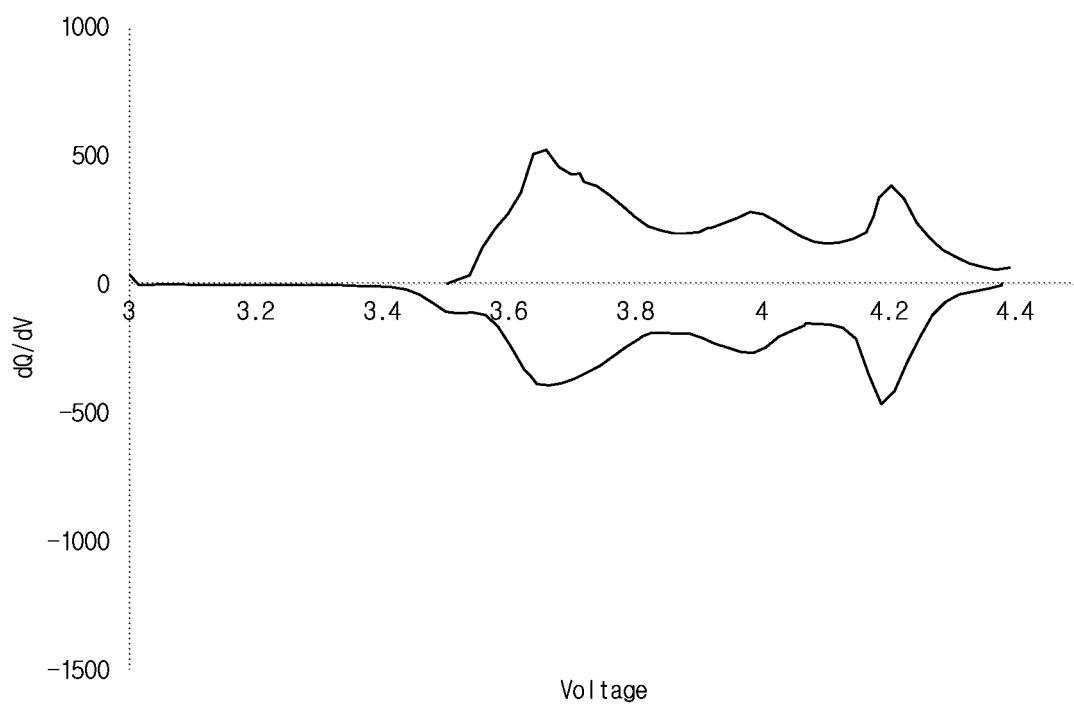
FIG. 12 is a graph in which the X axis indicates a voltage (V) and the Y axis indicates dQ/dV for a positive electrode active material according to Example 9.
Figure 13:
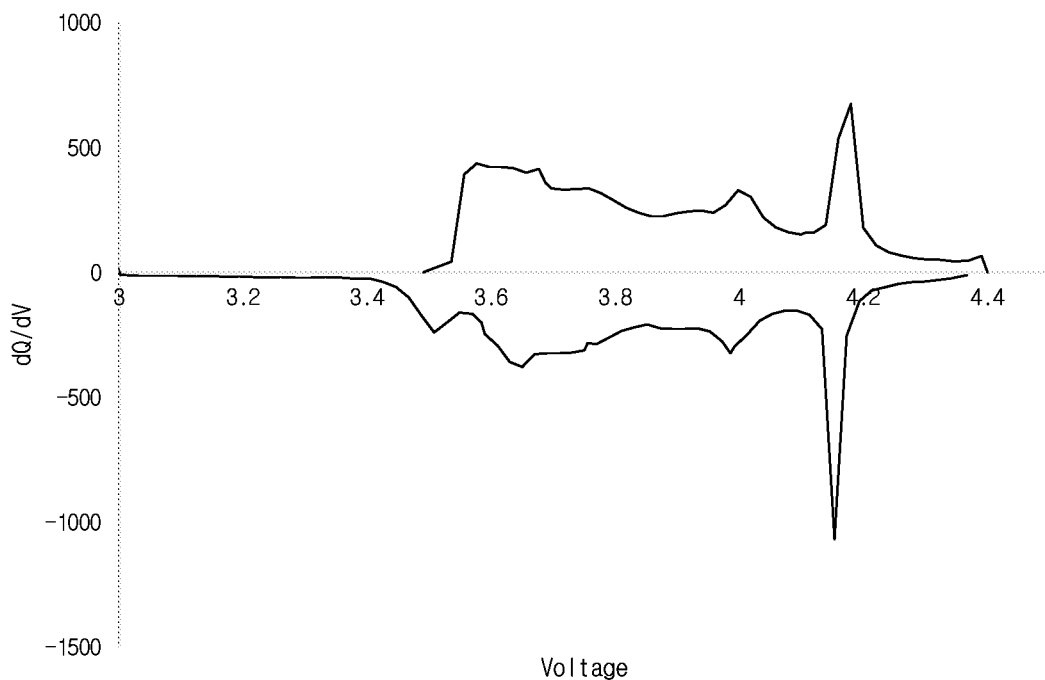
FIG. 13 is a graph in which the X axis indicates a voltage (V) and the Y axis indicates dQ/dV for a positive electrode active material according to Comparative Example 1.
Figure 14:
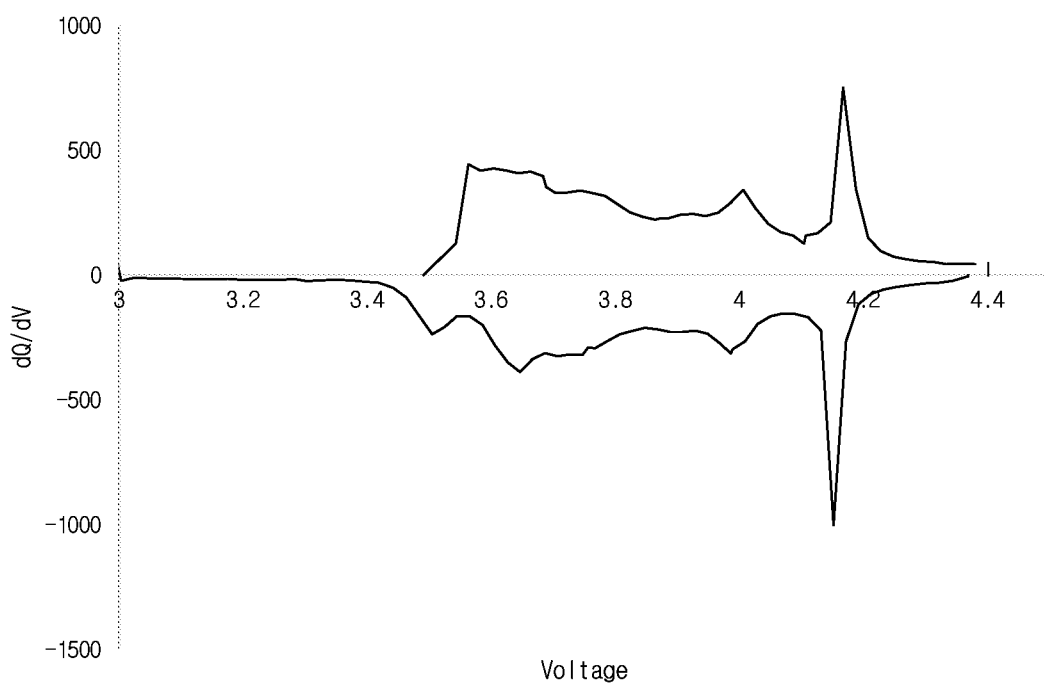
FIG. 14 is a graph in which the X axis indicates a voltage (V) and the Y axis indicates dQ/dV for a positive electrode active material according to Comparative Example 2.
Figure 15:
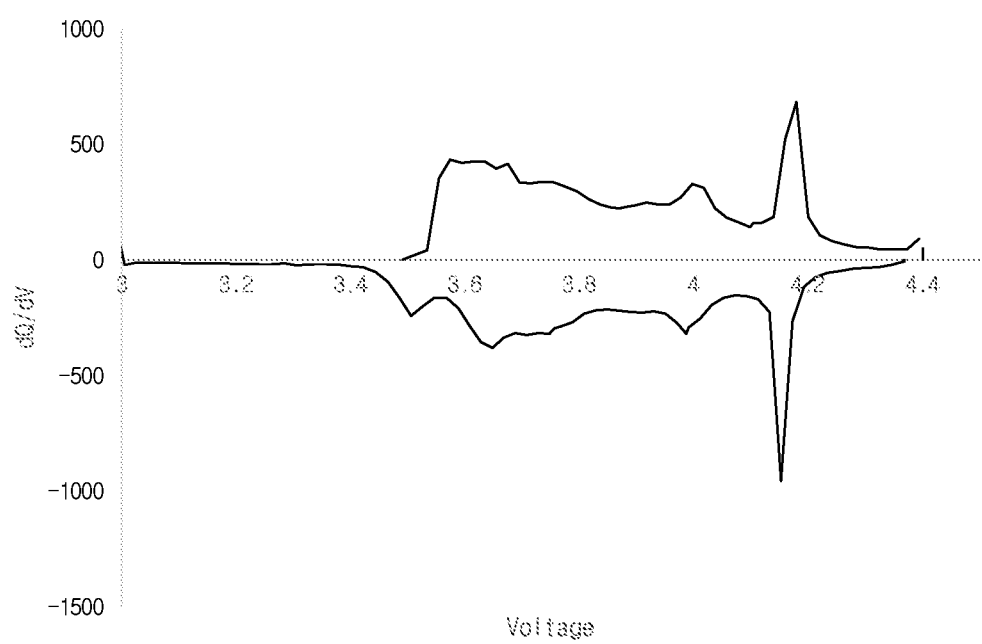
FIG. 15 is a graph in which the X axis indicates a voltage (V) and the Y axis indicates dQ/dV for a positive electrode active material according to Comparative Example 3.

FIGS. 2 and 3 schematically show the cross-section of a lithium composite oxide from which a grain boundary density defined herein is calculated. The grain boundary densities of the lithium composite oxides calculated with reference to FIGS. 2 and 3 are shown in Table 1 below.

TABLE 1

| Classification | FIG. 2 | FIG. 3 |
|---|---|---|
| Number of boundary surfaces (grain boundaries) between primary particles lying on virtual straight line | 1 | 3 |
| Number of primary particles lying on virtual straight line | 2 | 4 |
| Grain boundary density | 0.5 | 0.75 |

Here, in the lithium composite oxide as shown in FIG. 2, since the number of boundary surfaces (grain boundaries) between primary particles lying on the virtual straight line is 1, and the number of primary particles lying on the virtual straight line is 2, the lithium composite oxide may have a structure with a grain boundary density of 0.5. In addition, although not shown separately, the lithium composite oxide may be a lithium composite oxide having a single crystal structure consisting of a single primary particle.

As the grain boundary density represented by Equation 8 is 0.90 or less, the surface area and boundary surface of the lithium composite oxide may be reduced, and thus side reactions between the positive electrode active material and an electrolyte solution may be reduced to improve high temperature stability as well as storage stability of the positive electrode active material.

In addition, when the positive electrode active material is a bimodal-type positive electrode active material which includes a first lithium composite oxide, which is a small particle, and a second lithium composite oxide, which is a large particle, both of the first lithium composite oxide and the second lithium composite oxide may have a grain boundary density of 0.90 or less, and preferably, 0.75 or less.

Lithium Secondary Battery

Another aspect of the present invention may provide a positive electrode including a positive electrode current collector and a positive electrode active material layer formed on the positive electrode current collector. Here, the positive electrode active material layer may include positive electrode active materials according to various embodiments of the present invention. Therefore, since the positive electrode active material is the same as described above, detailed description thereof will be omitted for convenience, and hereinafter, other components that have not been described will be described.

The positive electrode current collector is not particularly limited as long as it does not cause a chemical change in a battery and has conductivity, and for example, stainless steel, aluminum, nickel, titanium, calcined carbon, or aluminum or stainless steel whose surface is treated with carbon, nickel, titanium or silver may be used. In addition, the positive electrode current collector may conventionally have a thickness of 3 to 500 μm, and fine irregularities may be formed on the surface of the current collector, thereby increasing the adhesive strength of a positive electrode active material. For example, the positive electrode current collector may be used in various forms such as a film, a sheet, a foil, a net, a porous body, foam, a non-woven fabric, etc.

The positive electrode active material layer may be prepared by coating the positive electrode current collector with a positive electrode slurry composition including the positive electrode active material, a conductive material, and a binder included optionally as needed.

Here, the positive electrode active material is included at 80 to 99 wt %, and specifically, 85 to 98.5 wt % with respect to the total weight of the positive electrode active material layer. When the positive electrode active material is included in the above content range, excellent capacity characteristics may be exhibited, but the present invention is not limited thereto.

The conductive material is used to impart conductivity to an electrode, and is not particularly limited as long as it has electron conductivity without causing a chemical change in a battery. A specific example of the conductive material may be graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conductive material may be generally contained at 0.1 to 15 wt % with respect to the total weight of the positive electrode active material layer.

The binder serves to improve attachment between particles of the positive electrode active material and the adhesive strength between the positive electrode active material and a current collector. A specific example of the binder may be polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof, and one or a mixture of two or more thereof may be used. The binder may be included at 0.1 to 15 wt % with respect to the total weight of the positive electrode active material layer.

The positive electrode may be manufactured according to a conventional method of manufacturing a positive electrode, except that the above-described positive electrode active material is used. Specifically, the positive electrode may be manufactured by coating the positive electrode current collector with a positive electrode slurry composition prepared by dissolving or dispersing the positive electrode active material, and optionally, a binder and a conductive material in a solvent, and drying and rolling the resulting product.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode active material, the conductive material and the binder and then imparting a viscosity for exhibiting excellent thickness uniformity when the slurry is applied to prepare a positive electrode.

In addition, in another exemplary embodiment, the positive electrode may be prepared by casting the positive electrode slurry composition on a separate support, and laminating a film obtained by delamination from the support on the positive electrode current collector.

Still another aspect of the present invention provides an electrochemical device including the above-described positive electrode. The electrochemical device may be, specifically, a battery, a capacitor, and more specifically, a lithium secondary battery.

The lithium secondary battery may specifically include a positive electrode, a negative electrode disposed opposite to the positive electrode, and a separator and an electrolyte, which are interposed between the positive electrode and the negative electrode. Here, since the positive electrode is the same as described above, for convenience, detailed description for the positive electrode will be omitted, and other components which have not been described below will be described in detail.

The lithium secondary battery may further include a battery case accommodating an electrode assembly of the positive electrode, the negative electrode and the separator, and optionally, a sealing member for sealing the battery case.

The negative electrode may include a negative electrode current collector and a negative electrode active material layer disposed on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 µm, and like the positive electrode current collector, fine irregularities may be formed on the current collector surface, thereby enhancing the binding strength of the negative electrode active material. For example, the negative electrode current collector may be used in various forms such as a film, a sheet, a foil, a net, a porous body, foam, a non-woven fabric, etc.

The negative electrode active material layer may be formed by coating the negative electrode current collector with a negative electrode slurry composition including the negative electrode active material, a conductive material and a binder optionally included as needed.

As the negative electrode active material, a compound enabling the reversible intercalation and deintercalation of lithium may be used. A specific example of the negative electrode active material may be a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and dedoping lithium such as $SiO_\beta$ ($0<\beta<2$), $SnO_2$, vanadium oxide, or lithium vanadium oxide; or a composite including the metallic compound and the carbonaceous material such as a Si—C composite or a Sn—C composite, and any one or a mixture of two or more thereof may be used. In addition, as the negative electrode active material, a metal lithium thin film may be used. In addition, as a carbon material, both low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high-temperature calcined carbon such as petroleum or coal tar pitch derived cokes.

The negative electrode active material may be included at 80 to 99 wt % with respect to the total weight of the negative electrode active material layer.

The binder is a component aiding bonding between a conductive material, an active material and a current collector, and may be generally added at 0.1 to 10 wt % with respect to the total weight of the negative electrode active material layer. Examples of the binder may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber, nitrile-butadiene rubber, fluorine rubber, and various copolymers thereof.

The conductive material is a component for further improving conductivity of the negative electrode active material, and may be added at 10 wt % or less, and preferably, 5 wt % or less with respect to the total weight of the negative electrode active material layer. The conductive material is not particularly limited as long as it does not cause a chemical change in the battery, and has conductivity, and may be, for example, graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorinated carbon, aluminum, or nickel powder; a conductive whisker such as zinc oxide or potassium titanate; a conductive metal oxide such as titanium oxide; or a conductive material such as a polyphenylene derivative.

In an exemplary embodiment, the negative electrode active material layer may be prepared by coating the negative electrode current collector with a negative electrode slurry composition prepared by dissolving or dispersing a negative electrode active material, and optionally, a binder and a conductive material in a solvent, and drying the coated composition, or may be prepared by casting the negative electrode slurry composition on a separate support and then laminating a film delaminated from the support on the negative electrode current collector.

Meanwhile, in the lithium secondary battery, a separator is not particularly limited as long as it is generally used in a lithium secondary battery to separate a negative electrode from a positive electrode and provide a diffusion path for lithium ions, and particularly, the separator has a low resistance to ion mobility of an electrolyte and an excellent electrolyte solution impregnation ability. Specifically, a porous polymer film, for example, a porous polymer film prepared of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be optionally used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which is able to be used in the production of a lithium secondary battery, but the present invention is not limited thereto.

Specifically, the electrolyte may include an organic solvent and a lithium salt.

The organic solvent is not particularly limited as long as it can serve as a medium enabling the transfer of ions involved in an electrochemical reaction of a battery. Specifically, the organic solvent may be an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate (for example, ethylene carbonate or propylene carbonate) having high ion conductivity and high permittivity to increase the charge/discharge performance of a battery and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of approximately 1:1 to 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance. Therefore, lithium ions can effectively migrate.

To enhance lifetime characteristics of the battery, inhibit a decrease in battery capacity, and enhance discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Here, the additive(s) may be included at 0.1 to 5 wt % with respect to the total weight of the electrolyte.

Since the lithium secondary battery including the positive electrode active material according to the present invention stably exhibits excellent discharge capacity, excellent output characteristics and excellent lifetime characteristics, it is useful in portable devices such as a mobile phone, a notebook computer and a digital camera and an electric automobile field such as a hybrid electric vehicle (HEV).

The appearance of the lithium secondary battery according to the present invention is not particularly limited, but may be a cylindrical, prismatic, pouch or coin type using a can. In addition, the lithium secondary battery may be used in a battery cell that is not only used as a power source of a small device, but also preferably used as a unit battery for a medium-to-large battery module including a plurality of battery cells.

According to yet another exemplary embodiment of the present invention, a battery module including the lithium secondary battery as a unit cell and/or a battery pack including the same is provided.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

Hereinafter, the present invention will be described in further detail with reference to examples. However, these examples are merely provided to explain the present invention, and it will not be interpreted that the scope of the present invention is limited by the examples below.

Preparation Example 1. Preparation of Positive Electrode Active Material (1) Example 1

$NiCoMn(OH)_2$ hydroxide precursors (Ni:Co:Mn=91:8:1 (at %)) for a first lithium composite oxide as a small particle and a second lithium composite oxide as a large particle were synthesized by a known co-precipitation method using nickel sulfate, cobalt sulfate and manganese sulfate. The hydroxide precursor (first hydroxide precursor) for the first lithium composite oxide had an average particle diameter (D50) of 3.0 μm and the hydroxide precursor (second hydroxide precursor) for the second lithium composite oxide had an average particle diameter (D50) of 18.0 μm.

Subsequently, the first hydroxide precursor and the second hydroxide precursor were mixed in a weight ratio of 30:70, LiOH (Li/(Ni+Co+Mn) mol ratio=1.05±0.05) was added to a calcination furnace, and thermally treated (first calcination) for 12 hours in the furnace by raising a temperature 2° C. per minute until 780° C. while an O2 atmosphere was maintained, thereby obtaining a mixture of the first lithium composite oxide and the second lithium composite oxide.

In addition, distilled water was added to the mixture of the first lithium composite oxide and the second lithium composite oxide, which washed for 1 hour, and dried in a vacuum dryer at 120° C. for 12 hours.

Subsequently, a bimodal-type positive electrode active material in which a first lithium composite oxide as a small particle and a second lithium composite oxide as a large particle were mixed in a predetermined ratio was obtained by thermally treating (second calcination) in a calcination furnace for 12 hours by raising a temperature 2° C. per minute until 700° C. while an $O_2$ atmosphere was maintained.

(2) Example 2

A positive electrode active material was prepared in the same manner as in Example 1, except that 0.5 mol % of NaNO$_3$, based on a mixture of the first hydroxide precursor and the second hydroxide precursor before first calcination, was additionally mixed and then thermally treated.

(3) Example 3

A positive electrode active material was prepared in the same manner as in Example 1, except that 0.3 mol % of Ba(OH)$_2$, based on a mixture of the first hydroxide precursor and the second hydroxide precursor before first calcination, was additionally mixed and then thermally treated.

(4) Example 4

A positive electrode active material was prepared in the same manner as in Example 1, except that thermal treatment (first calcination) was performed for 12 hours by raising a temperature 2° C. per minute until 820° C.

(5) Example 5

A positive electrode active material was prepared in the same manner as in Example 4, except that 0.5 mol % of NaNO$_3$, based on a mixture of the first hydroxide precursor and the second hydroxide precursor before first calcination, was additionally mixed and then thermally treated.

(6) Example 6

A positive electrode active material was prepared in the same manner as in Example 4, except that 0.3 mol % of Ba(OH)$_2$, based on a mixture of the first hydroxide precursor and the second hydroxide precursor before first calcination, was additionally mixed and then thermally treated.

(7) Example 7

A positive electrode active material was prepared in the same manner as in Example 1, except that thermal treatment (first calcination) was performed for 12 hours by raising a temperature 2° C. per minute until 850° C.

(8) Example 8

A positive electrode active material was prepared in the same manner as in Example 7, except that 0.5 mol % of NaNO$_3$, based on a mixture of the first hydroxide precursor and the second hydroxide precursor before first calcination, was additionally mixed and then thermally treated.

(9) Example 9

A positive electrode active material was prepared in the same manner as in Example 7, except that 0.3 mol % of Ba(OH)$_2$, based on a mixture of the first hydroxide precursor and the second hydroxide precursor before first calcination, was additionally mixed and then thermally treated.

(10) Comparative Example 1

A positive electrode active material was prepared in the same manner as in Example 1, except that thermal treatment (first calcination) was performed for 8 hours by raising a temperature 2° C. per minute until 700° C.

(11) Comparative Example 2

A positive electrode active material was prepared in the same manner as in Example 1, except that thermal treatment (first calcination) was performed for 8 hours by raising a temperature 2° C. per minute until 705° C.

(12) Comparative Example 3

A positive electrode active material was prepared in the same manner as in Example 1, except that thermal treatment (first calcination) was performed for 8 hours by raising a temperature 2° C. per minute until 710° C.

Preparation Example 2. Production of Lithium Secondary Battery

A positive electrode slurry was prepared by dispersing 92 wt % of each of the positive electrode active materials prepared according to Preparation Example 1, 4 wt % of artificial graphite and 4 wt % of PVDF binder in 30 g of N-methyl-2-pyrrolidone (NMP). A positive electrode for a lithium secondary battery was produced by uniformly coating an aluminum thin film having a thickness of 15 μm with the positive electrode slurry, and vacuum-drying the thin film at 135° C.

A coin battery was produced using the above positive electrode, a lithium foil as a counter electrode for the positive electrode, a porous polyethylene film (Celgard 2300, thickness: 25 μm) as a separator, and an electrolyte in which LiPF$_6$ was present at a concentration of 1.15M in a solvent prepared by mixing ethylene carbonate and ethyl methyl carbonate in a volume ratio of 3:7.

Experimental Example 1. Structural Analysis of Positive Electrode Active Material Cross-sectional SEM images were obtained using FE-SEM (Bruker) for a first lithium composite oxide, which is a small particle, and a second lithium composite oxide, which is a large particle, included in the positive electrode active materials prepared in Preparation Example 1, and an average value of grain boundary densities according to Equation 8 below was calculated from the cross-sectional SEM images.

Grain boundary density=(the number of boundary surfaces between primary particles lying on a virtual straight line crossing the center of the lithium composite oxide in the cross-sectional SEM image of the lithium composite oxide/the number of primary particles lying on the virtual straight line)  [Equation 8]

The results of measuring a grain boundary density are shown in Table 2 below.

TABLE 2

| Classification | Average value of grain boundary density | |
| --- | --- | --- |
| | First lithium composite oxide | Second lithium composite oxide |
| Example 1 | 0.88 | 0.90 |
| Example 2 | 0.86 | 0.86 |
| Example 3 | 0.83 | 0.89 |

TABLE 2-continued

| Classification | Average value of grain boundary density | |
|---|---|---|
| | First lithium composite oxide | Second lithium composite oxide |
| Example 4 | 0.75 | 0.83 |
| Example 5 | 0.67 | 0.80 |
| Example 6 | 0.67 | 0.80 |
| Example 7 | 0.67 | 0.75 |
| Example 8 | 0.67 | 0.67 |
| Example 9 | 0.50 | 0.67 |
| Comparative Example 1 | 0.94 | 0.95 |
| Comparative Example 2 | 0.93 | 0.95 |
| Comparative Example 3 | 0.92 | 0.94 |

Experimental Example 2. Evaluation of Electrochemical Properties of Positive Electrode Active Material (1) Results of Measuring Peak Intensity Ratio and Voltage Ratio of Lithium Secondary Battery When the lithium secondary batteries produced according to Preparation Example 2 were charged/discharged at 25° C. under the following charging/discharging conditions, the voltage (V) and battery capacity (Q) at the 3$^{rd}$ cycle were measured using an electrochemical analyzer (Toyo, Toscat-3100), and a graph illustrating the voltage (V) and the battery capacity (Q) at the 3$^{rd}$ cycle and having an X axis indicating the voltage (V) and a Y axis indicating a value (dQ/dV) obtained by differentiating the battery capacity (Q) with respect to the voltage (V) was obtained, and then a peak intensity ratio defined by Equations 1 to 6 and a voltage ratio defined by Equation 7 were obtained from the graph. The peak intensity ratio defined by Equations 1 to 6 and a voltage ratio defined by Equation 7 are shown in Tables 3 to 6 below.

[Charging/Discharging Conditions]
1st cycle:
 Cut off voltage 3.0V~4.3V
 charging: 0.1 C (CCCV)/discharging: 0.1 C (CC)
2$^{nd}$ cycle:
 Cut off voltage 3.0V~4.3V
 charging: 0.1 C (CCCV)/discharging: 0.1 C (CC)
3$^{rd}$ cycle:
 Cut off voltage 3.0V~4.4V
 charging: 1 C (CCCV)/discharging: 1 C (CC)

TABLE 3

| Classification | Example 1 | Example 2 | Example 3 |
|---|---|---|---|
| I1 | 469.7 | 479.1 | 469.8 |
| V1 | 3.64 | 3.64 | 3.64 |
| I2 | 330.2 | 332.9 | 330.8 |
| V2 | 4 | 4 | 4 |
| I3 | 589.2 | 622.4 | 642.2 |
| V3 | 4.16 | 4.18 | 4.17 |
| I1/I2 (A) | 1.42 | 1.44 | 1.42 |
| I1/I3 (B) | 0.8 | 0.77 | 0.73 |
| I2/I3 (C) | 0.56 | 0.53 | 0.52 |
| DI1 | −393.4 | −394.1 | −383.6 |
| DV1 | 3.65 | 3.64 | 3.63 |
| DI2 | −305.7 | −310.8 | −300.2 |
| DV2 | 3.99 | 3.98 | 4 |
| DI3 | −712.7 | −758.3 | −784 |
| DV3 | 4.15 | 4.16 | 4.16 |
| DI1/DI2 (D) | 1.29 | 1.27 | 1.28 |
| DI1/DI3 (E) | 0.55 | 0.52 | 0.49 |
| DI2/DI3 (F) | 0.43 | 0.41 | 0.38 |
| |V1-DV1| (G) | 0.007 | 0 | 0.008 |

TABLE 4

| Classification | Example 4 | Example 5 | Example 6 |
|---|---|---|---|
| I1 | 486.6 | 494.8 | 487.5 |
| V1 | 3.63 | 3.64 | 3.64 |
| I2 | 314.1 | 311 | 311.2 |
| V2 | 3.99 | 3.98 | 3.99 |
| I3 | 572.8 | 577.2 | 520.3 |
| V3 | 4.17 | 4.19 | 4.19 |
| I1/I2 (A) | 1.55 | 1.59 | 1.57 |
| I1/I3 (B) | 0.85 | 0.86 | 0.94 |
| I2/I3 (C) | 0.55 | 0.54 | 0.6 |
| DI1 | −395.5 | −399.4 | −405.9 |
| DV1 | 3.65 | 3.64 | 3.63 |
| DI2 | −305.5 | −301.1 | −303.1 |
| DV2 | 3.99 | 3.98 | 3.98 |
| DI3 | −761.7 | −786.1 | −782 |
| DV3 | 4.16 | 4.16 | 4.17 |
| DI1/DI2 (D) | 1.29 | 1.33 | 1.34 |
| DI1/DI3 (E) | 0.52 | 0.51 | 0.52 |
| DI2/DI3 (F) | 0.4 | 0.38 | 0.39 |
| |V1-DV1| (G) | 0.019 | 0.002 | 0.018 |

TABLE 5

| Classification | Example 7 | Example 8 | Example 9 |
|---|---|---|---|
| I1 | 533.6 | 525.7 | 519.9 |
| V1 | 3.64 | 3.64 | 3.66 |
| I2 | 277.9 | 278.2 | 278.1 |
| V2 | 3.99 | 3.98 | 3.98 |
| I3 | 378 | 379.9 | 381 |
| V3 | 4.21 | 4.21 | 4.2 |
| I1/I2 (A) | 1.92 | 1.89 | 1.87 |
| I1/I3 (B) | 1.41 | 1.38 | 1.36 |
| I2/I3 (C) | 0.74 | 0.73 | 0.73 |
| DI1 | −392.4 | −394.9 | −394.8 |
| DV1 | 3.64 | 3.66 | 3.66 |
| DI2 | −268.3 | −271.2 | −269.7 |
| DV2 | 3.99 | 3.97 | 3.99 |
| DI3 | −463.7 | −475.6 | −467.1 |
| DV3 | 4.19 | 4.19 | 4.19 |
| DI1/DI2 (D) | 1.46 | 1.46 | 1.46 |
| DI1/DI3 (E) | 0.85 | 0.83 | 0.85 |
| DI2/DI3 (F) | 0.58 | 0.57 | 0.58 |
| |V1-DV1| (G) | 0.001 | 0.022 | 0.005 |

TABLE 6

| Classification | Comparative Example 1 | Compamtive Example 2 | Compamtive Example 3 |
|---|---|---|---|
| I1 | 436.8 | 444.3 | 433.4 |
| V1 | 3.58 | 3.56 | 3.58 |
| I2 | 328.9 | 341.6 | 327.9 |
| V2 | 4 | 4.01 | 4.01 |
| I3 | 674 | 749.8 | 683.2 |
| V3 | 4.18 | 4.17 | 4.19 |
| I1/I2 (A) | 1.33 | 1.3 | 1.32 |
| I1/I3 (B) | 0.65 | 0.59 | 0.63 |
| I2/I3 (C) | 0.49 | 0.46 | 0.48 |
| DI1 | −378.4 | −387.7 | −379.6 |
| DV1 | 3.65 | 3.65 | 3.65 |
| DI2 | −322.6 | −313.3 | −319.9 |
| DV2 | 3.99 | 3.99 | 3.99 |
| DI3 | −1067 | −1001 | −957 |
| DV3 | 4.15 | 4.15 | 4.15 |
| DI1/DI2 (D) | 1.17 | 1.24 | 1.19 |
| DI1/DI3 (E) | 0.35 | 0.39 | 0.4 |
| DI2/DI3 (F) | 0.3 | 0.31 | 0.33 |
| |V1-DV1|(G) | 0.074 | 0.084 | 0.064 |

(2) Evaluation of Battery Capacity and Lifetime Characteristics of Lithium Secondary Battery The lithium secondary batteries produced according to Preparation Example 2 were charged/discharged 50 cycles using an electrochemical analyzer (Toyo, Toscat-3100) at 25° C. within a driving voltage range of 3.0V to 4.4V under a condition of 1 C/1 C, and then capacity retention at the 50$^{th}$ cycle with respect to the initial capacity was measured.

The results of evaluating the lifetime characteristics of the lithium secondary batteries measured according to the method are shown in Table 7 below.

TABLE 7

| Classification | Lifetime (%, @50cy) |
|---|---|
| Example 1 | 83.6 |
| Example 2 | 82.1 |
| Example 3 | 81.1 |
| Example 4 | 85.5 |
| Example 5 | 84.7 |
| Example 6 | 83.6 |
| Example 7 | 89.9 |
| Example 8 | 93 |
| Example 9 | 91.1 |
| Comparative Example 1 | 70.3 |
| Comparative Example 2 | 64.4 |
| Comparative Example 3 | 72.8 |

Referring to the results of Table 7, in the lithium secondary batteries using the positive electrode active materials according to Examples 1 to 9, it was confirmed that lifetime characteristics are improved compared to the lithium secondary batteries using the Comparative Examples 1 to 3.

Experimental Example 3. Evaluation of Stability of Positive Electrode Active Material and Lithium Secondary Battery (1) Evaluation of Thermal Stability of Positive Electrode Active Material To evaluate the thermal stability of the positive electrode active materials prepared according to Preparation Example 1, weight loss was measured using a thermogravimetric analyzer (TA Instruments, Q20) under an atmospheric pressure in an Ar atmosphere at 25° C. at a temperature-increasing rate of 10° C./min until 350° C. Here, the starting temperature (op-set) at which a weight loss (pyrolysis) peak for each positive electrode active material appears is shown in Table 8 below.

TABLE 8

| Classification | On-set Temp. (° C.) |
|---|---|
| Example 1 | 234 |
| Example 2 | 236 |
| Example 3 | 233 |
| Example 4 | 234 |
| Example 5 | 235 |
| Example 6 | 237 |
| Example 7 | 242 |
| Example 8 | 241 |
| Example 9 | 244 |
| Comparative Example 1 | 228 |
| Comparative Example 2 | 227 |
| Comparative Example 3 | 229 |

Referring to the results of Table 8, in the positive electrode active materials according to Examples 1 to 9, it was confirmed that the starting temperature (on-set) at which a weight loss (pyrolysis) peak appears is higher than that of the positive electrode active materials according to Comparative Examples 1 to 3. That is, it can be seen that the thermal stability of the positive electrode active materials according to Examples 1 to 9 are higher than that of the positive electrode active materials according to Comparative Examples 1 to 3.

(2) Measurement of Amount of Gas Generation of Lithium Secondary Battery

The lithium secondary batteries prepared according to Preparation Example 2 were charged at a constant current of 0.2 C until 4.25 V, and then stored at 60° C. for 14 days, followed by measuring the volume change of a lithium secondary battery caused by gas generation therein. The results of measuring a volume change are shown in Table 9 below.

TABLE 9

| Classification | Volume change ratio (%) |
|---|---|
| Example 1 | 5.8 |
| Example 2 | 4.6 |
| Example 3 | 2.7 |
| Example 4 | 3.2 |
| Example 5 | 2.5 |
| Example 6 | 4.2 |
| Example 7 | 0.9 |
| Example 8 | 1.7 |
| Example 9 | 0.6 |
| Comparative Example 1 | 12 |
| Comparative Example 2 | 19 |
| Comparative Example 3 | 14 |

Referring to the results of Table 9, it was confirmed that the amount of volume change of the lithium secondary battery using each of the positive electrode active materials according to Examples 1 to 9 is smaller than that of the lithium secondary batteries using the positive electrode active materials according to Comparative Examples 1 to 3.

A positive electrode active material according to the present invention exhibits a predetermined peak intensity ratio and a predetermined voltage ratio in a graph illustrating the voltage (V) and the battery capacity (Q) at the 3$^{rd}$ cycle and having an X axis indicating the voltage (V) and a Y axis indicating a value (dQ/dV) obtained by differentiating the battery capacity (Q) with respect to the voltage (V) when charging/discharging is performed under predetermined conditions, and in this case, the high capacity characteristics of a high-Ni positive electrode active material having an Ni content of 50% or more, and preferably, 80% or more, can be maintained, and the structural instability, pointed out as a disadvantage of the high-Ni positive electrode active material, can be improved.

In addition, since the positive electrode active material according to the present invention is a bimodal-type positive electrode active material including a first lithium composite oxide, which is a small particle, and a second lithium composite oxide, which is a large particle, these particles having different average particle diameters, a void between large particles is filled with small particles with a relatively smaller average particle diameter. Therefore, the integration density of the lithium composite oxide in unit volume can be improved, thereby increasing an energy density per unit volume.

Moreover, the positive electrode active material according to the present invention can lower a grain boundary density of the lithium composite oxide constituting the positive electrode active material, thereby reducing the surface area and boundary surface of the lithium composite oxide, and thus side reactions between the positive electrode active material and an electrolyte solution can be reduced to improve high temperature stability as well as storage stability of the positive electrode active material.

What is claimed is:

1. A positive electrode active material comprising a lithium composite oxide enabling lithium intercalation/deintercalation, wherein the positive electrode active material comprises a first lithium composite oxide, and a second lithium composite oxide that has a larger average particle diameter than the first lithium composite oxide, wherein when a lithium secondary battery using the positive electrode active material as a positive electrode and a lithium foil as a negative electrode is charged/discharged under the following charging/discharging conditions,

[Charging/discharging conditions]
$1^{st}$ cycle:
Cut off voltage 3.0V~4.3V
charging: 0.1 C (CCCV)/discharging: 0.1 C (CC)
$2^{nd}$ cycle:
Cut off voltage 3.0V~4.3V
charging: 0.1 C (CCCV)/discharging: 0.1 C (CC)
$3^{rd}$ cycle:
Cut off voltage 3.0V~4.4V
charging: 1 C (CCCV)/discharging: 1 C (CC)

in a graph illustrating the voltage (V) and the battery capacity (Q) at the $3^{rd}$ cycle and having an X axis indicating the voltage (V) and a Y axis indicating a value (dQ/dV) obtained by differentiating the battery capacity (Q) with respect to the voltage (V), a peak intensity ratio (A) defined in Equation 1 below is satisfied:

$$I1/I2 \geq 1.4 \qquad \text{[Equation 1]}$$

(In Equation 1,
I1 is a y axis value (dQ/dV) for a peak shown between 3.0V and 3.8V in a charging region, and
I2 is a y axis value (dQ/dV) for a peak shown between 3.8V and 4.1V in a charging region).

2. The positive electrode active material of claim 1, wherein a peak intensity ratio (B) defined by Equation 2 below is satisfied:

$$I1/I3 \geq 0.7 \qquad \text{[Equation 2]}$$

(In Equation 2,
I1 is a y axis value (dQ/dV) for a peak shown between 3.0V and 3.8V in a charging region, and
I3 is a y axis value (dQ/dV) for a peak shown between 4.1V and 4.4V in a charging region).

3. The positive electrode active material of claim 1, wherein a peak intensity ratio (C) defined by Equation 3 below is satisfied:

$$I2/I3 \geq 0.5 \qquad \text{[Equation 3]}$$

(In Equation 3,
I2 is a y axis value (dQ/dV) for a peak shown between 3.8V and 4.1V in a charging region, and
I3 is a y axis value (dQ/dV) for a peak shown between 4.1V and 4.4V in a charging region).

4. The positive electrode active material of claim 1, wherein a peak intensity ratio (D) defined by Equation 4 below is satisfied:

$$DI1/DI2 \geq 1.25 \qquad \text{[Equation 4]}$$

(In Equation 4,
DI1 is a y axis value (dQ/dV) for a peak shown between 3.0V and 3.8V in a discharging region, and
DI2 is a y axis value (dQ/dV) for a peak shown between 3.8V and 4.1V in a discharging region).

5. The positive electrode active material of claim 1, wherein a peak intensity ratio (E) defined by Equation 5 below is satisfied:

$$DI1/DI3 \geq 0.41 \qquad \text{[Equation 5]}$$

(In Equation 5,
DI1 is a y axis value (dQ/dV) for a peak shown between 3.0V and 3.8V in a discharging region, and
DI3 is a y axis value (dQ/dV) for a peak shown between 4.1V and 4.4V in a discharging region).

6. The positive electrode active material of claim 1, wherein a peak intensity ratio (F) defined by Equation 6 below is satisfied:

$$DI2/DI3 \geq 0.34 \qquad \text{[Equation 6]}$$

(In Equation 6,
DI2 is a y axis value (dQ/dV) for a peak shown between 3.8V and 4.1V in a discharging region, and
DI3 is a y axis value (dQ/dV) for a peak shown between 4.1V and 4.4V in a discharging region).

7. The positive electrode active material of claim 1, wherein a voltage ratio (G) defined by Equation 7 below is satisfied:

$$|\Delta V1=(V1-DV1)| \leq 0.05 \qquad \text{[Equation 7]}$$

(In Equation 7,
V1 is an X-axis value (V) for a peak shown between 3.0V and 3.8V in a charging region, and
DV1 is an X-axis value (V) for a peak shown between 3.0V and 3.8V in a discharging region).

8. The positive electrode active material of claim 1, wherein the lithium composite oxide is represented by Formula 1 below:

$$Li_aNi_{1-(b+c+d+e)}Co_bM1_cM2_dM3_eO_f \qquad \text{[Formula 1]}$$

(Here,
M1 is at least one selected from Mn and Al,
M2 and M3 are each independently selected from Al, Ba, B, Ce, Cr, Mg, Mn, Mo, Na, K, P, Sr, Ti, W, Nb and Zr,
M1 to M3 are different,
and (0.90≤a≤1.05, 0≤b≤0.10, 0≤c≤0.10, 0≤d≤0.025, 0≤e≤0.025, and 1.0≤f≤2.0).

9. The positive electrode active material of claim 1, wherein the first lithium composite oxide has an average particle diameter (D50) of 8 μm or less.

10. The positive electrode active material of claim 1, wherein the second lithium composite oxide has an average particle diameter (D50) of 8.5 μm or more.

11. The positive electrode active material of claim 1, wherein the first lithium composite oxide and the second composite oxide is a composite particle comprising at least one primary particle, and in a cross-sectional SEM image of the composite particle, a grain boundary density is 0.90 or less, as calculated by Equation 8 below, for primary particles lying on a virtual straight line crossing the center of the composite particle in a cross-sectional SEM image:

Grain boundary density=(the number of boundary surfaces between primary particles lying on the virtual straight line/the number of primary particles lying on the virtual straight line). [Equation 8]

12. The positive electrode active material of claim 11, wherein the lithium composite oxide has a single crystal structure.

13. A positive electrode comprising the positive electrode active material of claim 1.

14. A lithium secondary battery using the positive electrode of claim 13.

* * * * *